United States Patent
Yamashita et al.

(10) Patent No.: US 6,830,038 B2
(45) Date of Patent: Dec. 14, 2004

(54) FUEL CUT CONTROL METHOD

(75) Inventors: Toshihiko Yamashita, Shizuoka-ken (JP); Tomoji Nakamura, Shizuoka-ken (JP)

(73) Assignee: Yamaha Hatsudoki Kabushiki Kaisha, Shuizuoka-ken (JP)

( * ) Notice: Subject to any disclaimer, the term of this patent is extended or adjusted under 35 U.S.C. 154(b) by 0 days.

(21) Appl. No.: 10/477,239
(22) PCT Filed: Oct. 18, 2002
(86) PCT No.: PCT/JP02/10824
§ 371 (c)(1), (2), (4) Date: Apr. 30, 2004
(87) PCT Pub. No.: WO03/036065
PCT Pub. Date: May 1, 2003

(65) Prior Publication Data
US 2004/0187843 A1 Sep. 30, 2004

(30) Foreign Application Priority Data
Oct. 19, 2001 (JP) .................................. 2001-321695

(51) Int. Cl.[7] .............................................. F02M 51/00
(52) U.S. Cl. ...................................... 123/493; 123/325
(58) Field of Search ................................ 123/493, 325, 123/326, 327, 319

(56) References Cited

U.S. PATENT DOCUMENTS

| | | | | |
|---|---|---|---|---|
| 4,484,497 A | * | 11/1984 | Hibino | 477/169 |
| 4,615,316 A | * | 10/1986 | Yasuhara | 123/333 |
| 4,696,278 A | * | 9/1987 | Ito et al. | 123/493 |
| 5,065,716 A | * | 11/1991 | Nakagawa et al. | 123/326 |
| 5,784,880 A | * | 7/1998 | Toshiro et al. | 60/277 |
| 5,928,111 A | * | 7/1999 | Sakakibara et al. | 477/181 |

FOREIGN PATENT DOCUMENTS

| | | |
|---|---|---|
| JP | 59-49329 | 3/1984 |
| JP | 63-140124 | 9/1988 |
| JP | 4-166637 | 6/1992 |

* cited by examiner

Primary Examiner—John T. Kwon
(74) Attorney, Agent, or Firm—Hogan & Hartson, LLP

(57) ABSTRACT

To provide a fuel cutoff control method for an engine including a secondary air introducing system, capable of preventing afterburning in an exhaust pipe at the time of fuel being cut off in a decelerating state of the engine.

A fuel cutoff control method during deceleration of an engine including a secondary air introducing pipe connected to an exhaust pipe, and an air cut valve provided on the secondary air introducing pipe, the method comprising a determination step of determining under predetermined condition's whether or not the engine is in a decelerating state, wherein in the decelerating state, a greater amount of fuel than a normally required amount of fuel flow is supplied during a predetermined period of time after the start of deceleration, and then fuel is cut off after the predetermined period of time has elapsed.

20 Claims, 3 Drawing Sheets

FUEL CUT CONTROL METHOD

FIELD OF THE INVENTION

This invention relates to a fuel cutoff control method for an engine and particularly to a fuel cutoff control method during deceleration for an automobile engine.

TECHNICAL BACKGROUND

In a conventional motorcycle or the like with a fuel injection engine mounted, engine operating conditions are determined based on load and engine speed. When it has been determined to be unnecessary to supply fuel because the engine is in a decelerating state, the supply of fuel is cut off and a fuel injection amount is reduced to 0. Reducing the fuel injection amount to 0 during deceleration provides a decelerating effect of engine braking, as well as improved fuel efficiency and cleaner exhaust gas.

Such a configuration is also used as a means for cleaning exhaust gas that a secondary air introducing pipe is connected to an exhaust pipe, and exhaust gas is recombusted with secondary air introduced to the exhaust pipe by utilizing the pulse of exhaust gas pressure. An air cut valve is provided on the secondary air introducing pipe. The air cut valve opens at high engine speed with the throttle opened during normal driving or acceleration to introduce secondary air, while closing at low engine speed with the throttle closed during deceleration to cut off the secondary air.

In a vehicle including this type of secondary air introducing system, during deceleration, the supply of secondary air to the exhaust pipe is cut off, and the supply of fuel is also cut off to reduce the fuel injection amount to 0 as described above.

However, in the case that the engine shifts from a normal running state to a decelerating state with the throttle being closed, if fuel is cut off simultaneously with the start of deceleration, fuel adhered to an intake pipe wall flows into a cylinder immediately after fuel is started being cut off. Since the adhered fuel is too lean to combust alone in the cylinder, it is exhausted into the exhaust pipe as unburned gas. In the case of a vehicle including the secondary air introducing system, the unburned gas which flows into the exhaust pipe reacts with secondary air to combust, thereby causing afterburning. The afterburning affects the engine itself as well as causing noise.

In order to prevent the afterburning, the foregoing air cut valve is provided to cut off the supply of the secondary air when the intake pipe pressure has been lowered to a specified value or below.

The air cut valve, however, operates with a delay, so that even if it is driven to be closed simultaneously with a fuel cutoff command, no afterburning can be completely prevented which occurs during an early stage after fuel has been cut off.

In view of the foregoing, an advantage of this invention is to provide a fuel cutoff control method for an engine including a secondary air introducing system, capable of preventing afterburning in an exhaust pipe at the time of fuel being cut off in a decelerating state of the engine.

SUMMARY OF THE INVENTION

In order to achieve the foregoing advantage, the invention provides a fuel cutoff control method during deceleration of an engine including a secondary air introducing pipe connected to an exhaust pipe, and an air cut valve provided on the secondary air introducing pipe, the method comprising a determination step of determining under predetermined conditions whether or not the engine is in a decelerating state, in which in the decelerating state, a greater amount of fuel than a normally required amount of fuel flow is supplied during a predetermined period of time after the start of deceleration, and then fuel is cut off after the predetermined period of time has elapsed.

In this configuration, even if it has been determined that fuel be cut off in a decelerating state of the engine, the fuel injection amount is not immediately reduced to 0. A required amount of fuel flow computed according to a normal program is multiplied by an increasing coefficient and an increased amount of injected fuel is supplied during a predetermined period of time until the air cut valve of the secondary air introducing pipe is closed. The fuel injection amount is reduced to 0 after the predetermined period of time has elapsed and the air cut valve has been closed. Thereby at the start of deceleration, when a throttle is closed and the fuel adhered to the intake pipe wall flows into the cylinder due to increased negative intake pressure, the adhered fuel completely combusts in the cylinder together with the additional fuel injected from the injector (the adhered fuel is too lean to combust alone). Therefore, nounburned gas flows into the exhaust pipe. Afterburning caused by reaction of the unburned gas and secondary air in the exhaust pipe is thus prevented.

Incidentally, the predetermined period of time may be set as the elapse of a predetermined time through time control or as predetermined engine cycles in the case that fuel cutoff control judgment is made per stroke (cycle).

In a preferred embodiment, when it has been determined at the determination step that the engine is not in the decelerating state, if the engine is regaining speed back from the decelerating state, a less amount of fuel than normally required is supplied.

In this configuration, when the engine returns to a normal running state back from the decelerating state while the throttle being reopened, a required amount of fuel flow computed according to a normal program is multiplied by a reducing coefficient and a reduced amount of required injected fuel is supplied. This prevents a sharp increase in engine speed caused by a sharp increase in the fuel injection amount and maintains a stable running state of a vehicle.

In another preferred embodiment, the fuel cutoff control method further comprises as the predetermined conditions: a step of determining the time elapsed since an engine start; and a step of determining cooling water temperature.

In this configuration, an intake air amount is calculated based on intake pipe pressure data detected as computing data at an appropriate crank angle. The intake air amount and engine speed can appropriately determine the operating conditions of the engine. Further, fuel cutoff control is prevented at an engine start and when cooling water temperature is low so that the stable operating conditions of the engine can be maintained.

DETAILED DESCRIPTION OF THE PREFERRED EMBODIMENTS

An embodiment of the present invention will be described below with reference to the accompanying drawings.

Figure 1:
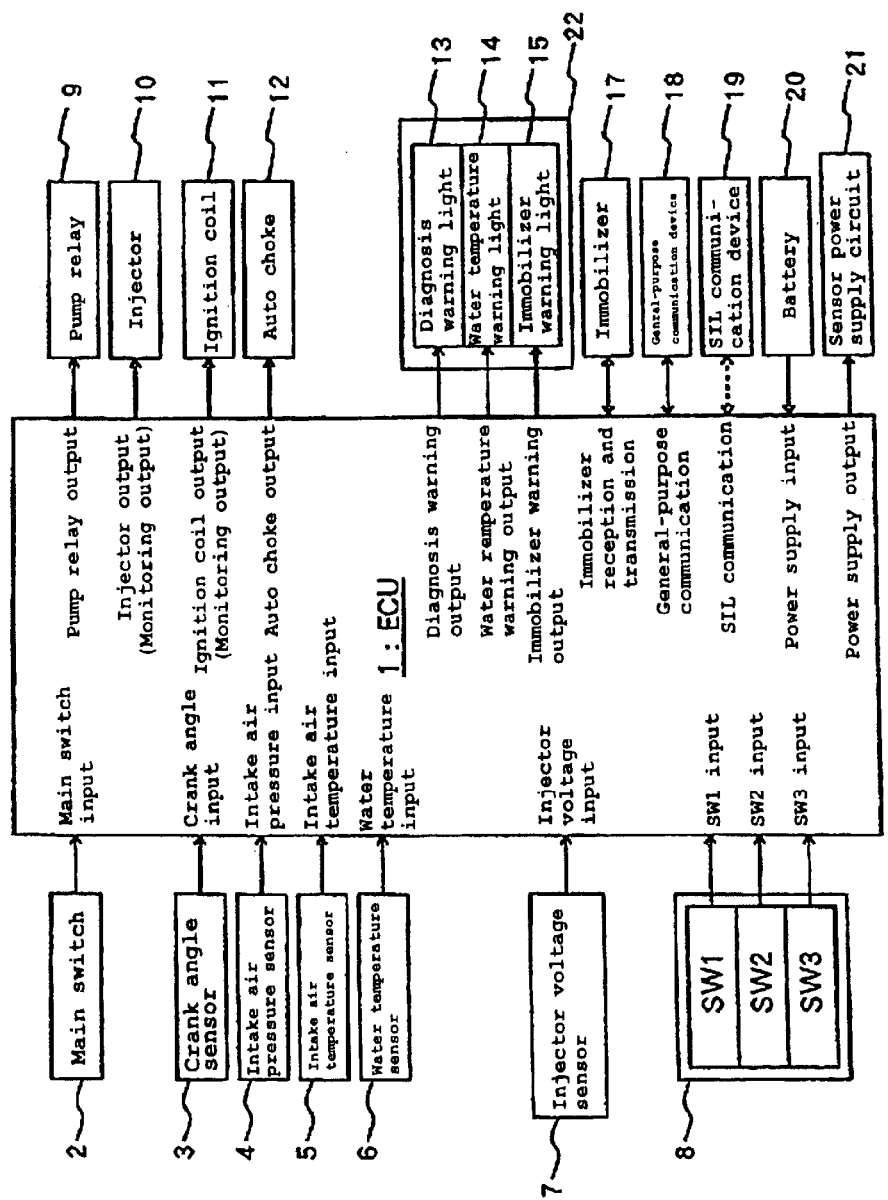
FIG. 1 shows a configuration of an overall control system of a motorcycle according to the invention.

FIG. 1 is a block diagram of an entire control system of a motorcycle according to the embodiment of the present invention.

An engine control unit (ECU) 1 is unitized to be an integral component. A control circuit CPU (not shown) of the ECU 1 receives inputs including an on/off signal from a main switch 2, a crank pulse signal from a crank pulse sensor 3, an intake air pressure detection signal from an intake air pressure sensor 4, an intake air temperature detection signal from an intake air temperature sensor S, a cooling water temperature detection signal from a water temperature sensor 6, a voltage signal from an injector voltage sensor 7 for controlling an injector, and a checking input signal from a switch box 8 having a plurality of switches SW1 to SW3. The ECU 1 is also connected to a battery 20, from which battery power supply is inputted.

For outputs from the ECU 1, the ECU 1 outputs a pump relay output signal to a pump relay 9 for driving a fuel pump, an injector output signal for driving an electromagnetic coil of an injector 10, an ignition coil output signal for driving an ignition coil 11, an auto choke output signal for driving an auto choke 12 in response to cooling water temperature, a diagnosis warning signal for driving a diagnosis warning lamp 13 in a meter 22 when an abnormality is detected, a water temperature warning signal for driving a water temperature warning lamp 14 to indicate a warning when the cooling water temperature exceeds a given temperature, and an immobilizer warning signal for driving an immobilizer warning lamp 15 when an immobilizer 17 of an engine key or the like is abnormally operated. Power supply voltage is outputted for supplying power to each sensor either through a sensor power supply circuit 21 or directly.

The ECU 1 is also connected to an external general-purpose communication device 18 and capable of inputting/outputting control data or the like through a general-purpose communication line. The ECU 1 is further connected to a serial communication device 19 and capable of handling serial communication.

Figure 2:
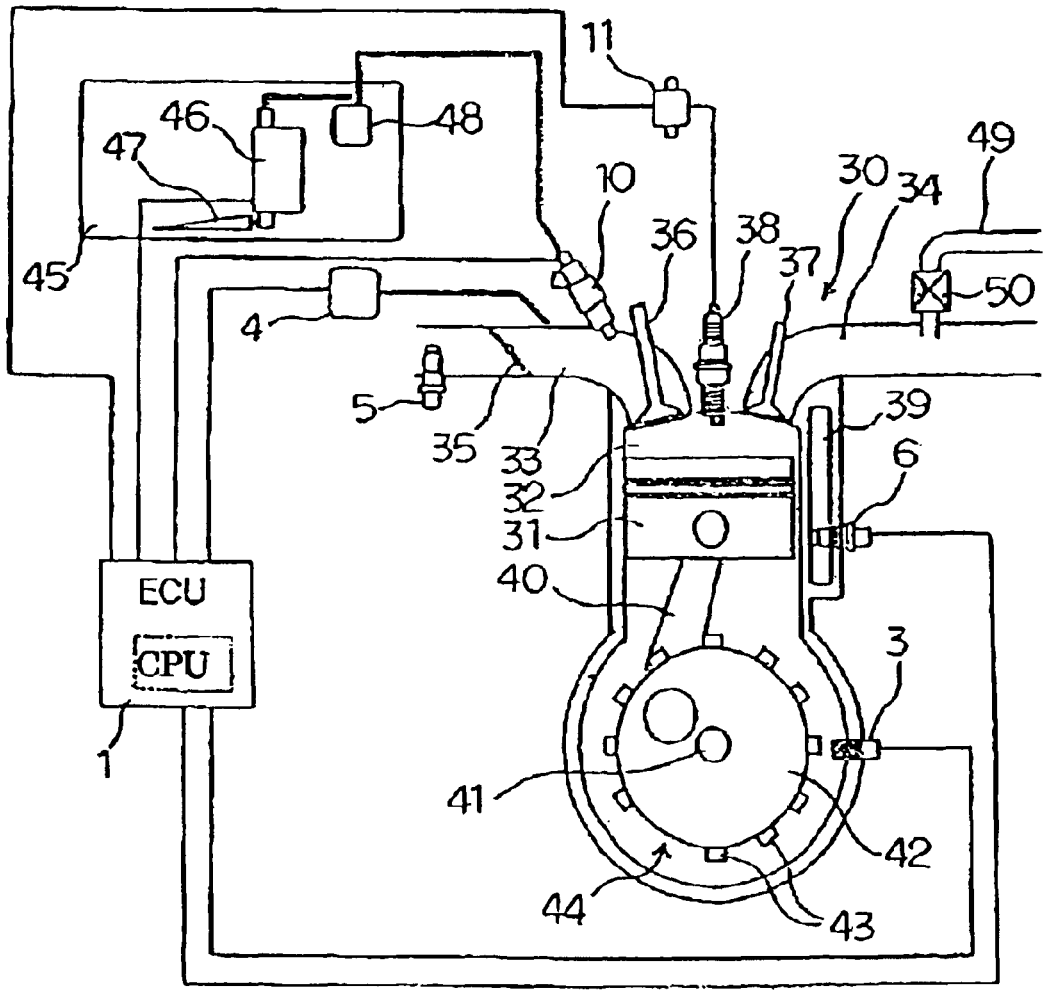
FIG. 2 is a schematic diagram of a crank angle detection device for an engine according to the present invention.

FIG. 2 is a system structure diagram of a crank angle detection device according to the embodiment of the present invention. A single-cylinder four-stroke engine 30 is formed with a combustion chamber 32 on top of a piston 31. An intake pipe 33 and an exhaust pipe 34 are connected to the combustion chamber 32 so as to communicate with the combustion chamber 32. A throttle valve 35 is provided in the intake pipe 33, and an intake valve 36 is disposed at an end thereof. An exhaust valve 37 is provided at an end of the exhaust pipe 34. A reference numeral 38 denotes a spark plug. A cooling jacket 39 is provided around a cylinder of the engine 30, to which the water temperature sensor 6 is attached. The piston 31 is connected to a crankshaft 41 via a connecting rod 40.

A ring gear 42 is integrally secured to the crankshaft 41. The ring gear 42 has plural teeth (projections) 43 formed at equal intervals, among which one toothless portion 44 is provided. The crank angle sensor (crank pulse sensor) 3 is provided for detecting the teeth 43 formed on the ring gear 42. The crank angle sensor 3 detects each tooth 43 to generate a pulse signal having a pulse width that corresponds to a lateral length on the upper side of the tooth. In this example, 12 portions to be each provided with the tooth 43 include one toothless portion 44 so that the sensor generates 11 (eleven) pulse signals one per 30° of one crank rotation.

The injector 10 is attached to the intake pipe 33. Fuel pumped from a fuel tank 45 through a filter 47 using a fuel pump 46 is delivered to the injector 10 under a constant fuel pressure maintained by a regulator 48. The ignition coil 11 controlled by the ECU 1 (FIG. 1) is connected to the spark plug 38. The intake air pressure sensor 4 and the intake air temperature sensor 5 are attached to the intake pipe 33, which are separately connected to the ECU 1.

A secondary air introducing pipe 49 for cleaning exhaust gas is connected to the exhaust pipe 34. An air cut valve 50 is provided on the secondary air introducing pipe 49. The air cut valve 50 opens at high engine speeds with the throttle opened during normal driving or acceleration to introduce secondary air, while closing at low engine speeds with the throttle closed during deceleration to cut off the secondary air.

Figure 3:
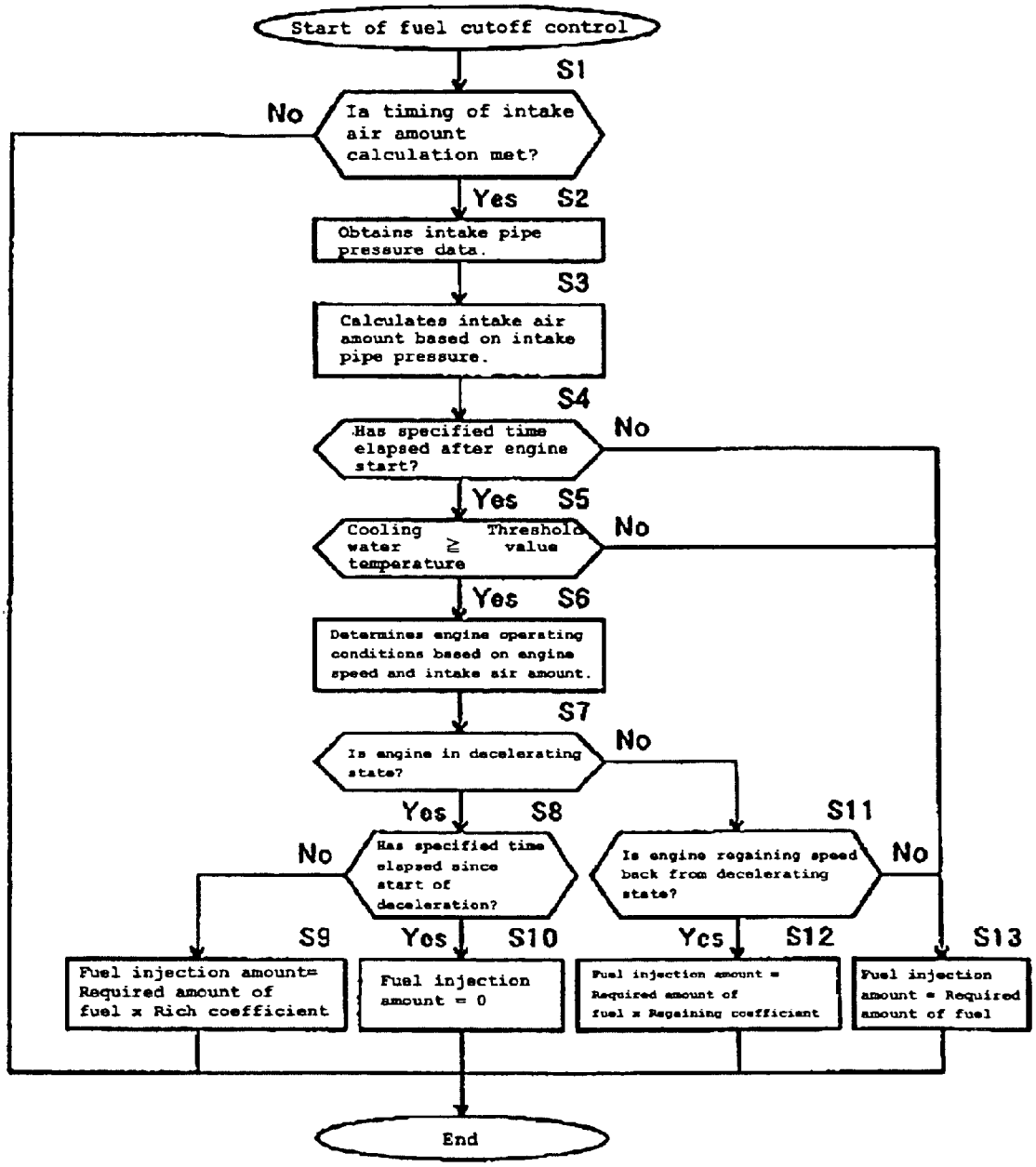
FIG. 3 is a flowchart of fuel cutoff control according to the invention.

FIG. 3 is a flowchart of fuel cutoff control according to the present invention. Step S1: Determines whether or not timing is correct for intake air amount calculation. Since the crank angle is predetermined at which intake pipe pressure used as an intake air amount calculation parameter can be properly detected, it is determined whether or not the timing at the predetermined crank angle is met. When the intake valve is open, the intake pipe pressure and in-cylinder pressure become approximately equal to each other. Intake pipe pressure data, therefore, is input when it is determined by a crank angle signal that an intake stroke is finished, and an intake air amount is calculated based on the input data.

The crank angle is detected in such a way that each of the teeth of the ring gear attached to the crankshaft is detected by the crank angle sensor, the generated crank pulse signal is input to the CPU in the ECU, and then the crank angle is determined from the signal data. The CPU is configured to run an interrupt program every time the crank angle signal is input, and engine speed is calculated based on intervals at which the pulse signals are inputted.

Step S2: Converts the detection data outputted from the intake air pressure sensor from analog to digital and then reads and saves if it is determined that the timing of the intake air amount calculation is met.

Step S3: Calculates the intake air amount based on the intake pipe pressure data.

Step S4: Determines whether or not a specified time has elapsed after an engine start. The elapsed time is measured here since the crankshaft rotation was started and the first crank pulse signal was generated. If the predetermined time has not yet elapsed, a determination is made that the engine has just been started. No fuel cutoff control is performed during the engine start because warm-up control is performed. If engine conditions have changed from warm-up to normal operation after the engine start and the elapse of the predetermined time (or if a certain time has elapsed since immediately after the engine start and the engine has shifted to a stable state even during warm-up), the process proceeds to the next step S5.

Step S5: Determines whether or not cooling water temperature is a predetermined threshold value or above. If the engine is being warmed up at low cooling water temperatures, no fuel cutoff control is performed. Instead, a normally required amount of injected fuel is calculated according to a program designed for warm-up and then supplied (step S13).

Step S6: Determines the engine operating conditions based on the result of a computation of engine speed and the intake air amount. This determines whether the engine is in a decelerating state or in an accelerating state, or running at a normal, constant speed.

Step S7: Determines whether or not the engine is in a decelerating state based on the result of the determination at the step S6.

Step S8: If the engine is in a decelerating state, it is determined whether or not a specified time has elapsed since the start of deceleration. The specified time is as long as the time during which the air cut valve of the secondary air introducing system is completely closed to end its operation.

Step S9: If the specified time has not yet elapsed at the step S8, that is, when the air cut valve is still open, a required amount of fuel calculated according to the engine operating conditions is multiplied by a rich coefficient (greater than 1) to increase the amount of fuel, and then fuel injection is performed. Thereby when the throttle is closed and the fuel adhered to an intake pipe wall flows into the cylinder due to increased negative intake pressure, the adhered fuel completely combusts in the cylinder together with the additional fuel injected from the injector (the adhered fuel is too lean to combust alone). Therefore, no unburned gas f lows into the exhaust pipe. Afterburning caused by reaction of the unburned gas and secondary air in the exhaust pipe is thus prevented.

Step S10: If the specified time has elapsed since the start of deceleration, that is, when the air cut valve of the secondary air introducing system has been completely closed, the fuel injection amount is reduced to 0. Since the secondary air is blocked in this state, even if the unburned gas flows into the exhaust pipe, afterburning is prevented from occurring.

Step S11: If the determination is made at the step S7 that the engine is not in a decelerating state, it is determined whether or not the engine is regaining speed back from the decelerating state.

Step S12: If the engine is regaining speed back from the decelerating state, a required amount of fuel calculated according to the engine operating conditions is multiplied by a regaining coefficient (smaller than 1) to reduce the amount of fuel, and then fuel injection is performed. This prevents a sharp increase in engine speed and allows the engine to smoothly shift to a normal running state from the decelerating state.

Step S13: Injects a required amount of fuel calculated according to the engine operating conditions directly from the injector.

INDUSTRIAL USABILITY

In the present invention as discussed above, even if it has been determined that fuel be cut off in a decelerating state of the engine, a fuel injection amount is not immediately reduced to 0. A required amount of fuel flow computed according to a normal program is multiplied by an increasing coefficient to supply an increased amount of injected fuel until the air cut valve of the secondary air introducing pipe is closed. The fuel injection amount is reduced to 0 after the air cut valve is closed. This allows the fuel to combust in the cylinder at the start of deceleration, even before the air cut valve of the secondary air introducing pipe is closed, so that the unburned gas is prevented from flowing into the exhaust pipe. Afterburning caused by reaction of the unburned gas and secondary air in the exhaust pipe is thus prevented.

What is claimed is:

1. A fuel cutoff control method, comprising:

determining under predetermined conditions whether or not an engine is in a decelerating state;

supplying a greater amount of fuel than a normally required amount of fuel flow during a predetermined period of time after starting to decelerate; and cutting off the fuel after the predetermined period of time has elapsed.

2. The fuel cutoff control method according to claim 1, further comprising supplying a less amount of fuel than normally required when it has been determined that the engine is not in the decelerating state, if the engine is regaining speed back from the decelerating state.

3. The fuel cutoff control method according to claim 1, further comprising: determining a time elapsed since an engine start; and determining a cooling water temperature as the predetermined conditions.

4. The fuel cutoff control method according to claim 2, further comprising: determining a time elapsed since an engine start; and determining a cooling water temperature as the predetermined conditions.

5. The fuel cutoff method according to claim 1, further comprising determining whether or not to take an intake air amount calculation.

6. The fuel cutoff method according to claim 5, further comprising calculating the intake air amount based on intake pipe pressure data.

7. The fuel cutoff method according to claim 6, further comprising inputting the intake pipe pressure data when it is determined that an intake stroke has been completed.

8. The fuel cutoff method according to claim 7, further comprising converting data from an intake air pressure sensor from analog data to digital data.

9. The fuel cutoff method according to claim 8, further comprising storing the converted data.

10. The fuel cutoff method according to claim 9, further comprising saving the converted data if it is determined that a timing of the intake air amount calculation has been met.

11. A fuel cutoff control device comprising:
an air introducing pipe connected to an exhaust pipe of an engine;
an air cut valve provided on the air introducing pipe; and
an electronic control unit that determines under predetermined conditions whether or not the engine is in a decelerating state,
wherein in the decelerating state, a greater amount of fuel than a normally required amount of fuel flow is supplied during a predetermined period of time after the start of deceleration and then fuel is cut off after the predetermined period of time has elapsed.

12. The fuel cutoff control device according to claim 11, wherein when it has been determined that the engine is not in the decelerating state, if the engine is regaining speed back from the decelerating state, a less amount of fuel than normally required is supplied.

13. The fuel cutoff control device according to claim 11, wherein the predetermined conditions include determining a time elapsed since an engine start and determining a cooling water temperature.

14. The fuel cutoff control device according to claim 11, wherein the air cut valve opens at a high engine speed with an engine throttle opened during normal driving or acceleration to introduce secondary air.

15. The fuel cutoff control device according to claim 11, wherein the air cut valve closes at a low engine speed with an engine throttle closed during deceleration to cutoff secondary air.

16. The fuel cutoff control device comprising:
an air introducing pipe connected to an exhaust pipe of an engine;
an air cut valve provided on the air introducing pipe; and
means for determining under predetermined conditions whether or not the engine is in a decelerating state,
wherein in the decelerating state, a greater amount of fuel than a normally required amount of fuel flow is supplied during a predetermined period of time after the start of deceleration and then fuel is cut off after the predetermined period of time has elapsed.

17. The fuel cutoff control device according to claim 16, wherein when it has been determined that the engine is not in the decelerating state, if the engine is regaining speed back from the decelerating state, a less amount of fuel than normally required is supplied.

18. The fuel cutoff control device according to claim 16, wherein the predetermined conditions include determining a time elapsed since an engine start and determining a cooling water temperature.

19. The fuel cutoff control device according to claim 14, wherein the air cut valve opens at a high engine speed with an engine throttle opened during normal driving or acceleration to introduce secondary air.

20. The fuel cutoff control device according to claim 16, wherein the air cut valve closes at a low engine speed with an engine throttle closed during deceleration to cutoff secondary air.

* * * * *